(12) United States Patent
Roach et al.

(10) Patent No.: US 9,914,282 B2
(45) Date of Patent: Mar. 13, 2018

(54) COMPOSITE MATERIAL WITH CONTROLLED FRACTURE REGIONS

(71) Applicant: United Technologies Corporation, Hartford, CT (US)

(72) Inventors: James T. Roach, Vernon, CT (US); Darin S. Lussier, Guilford, CT (US)

(73) Assignee: UNITED TECHNOLOGIES CORPORATION, Farmington, CT (US)

( * ) Notice: Subject to any disclaimer, the term of this patent is extended or adjusted under 35 U.S.C. 154(b) by 211 days.

(21) Appl. No.: 14/827,414

(22) Filed: Aug. 17, 2015

(65) Prior Publication Data

US 2016/0263856 A1    Sep. 15, 2016

Related U.S. Application Data

(60) Provisional application No. 62/046,298, filed on Sep. 5, 2014.

(51) Int. Cl.
*B32B 3/26* (2006.01)
*B32B 5/02* (2006.01)
(Continued)

(52) U.S. Cl.
CPC .......... *B32B 3/266* (2013.01); *B29C 37/0057* (2013.01); *B29C 70/54* (2013.01); *B32B 3/18* (2013.01); *B32B 3/263* (2013.01); *B32B 5/02* (2013.01); *B32B 5/024* (2013.01); *B32B 5/14* (2013.01); *B32B 5/145* (2013.01); *B32B 5/26* (2013.01); *B32B 7/02* (2013.01); *B32B 9/007* (2013.01); *B32B 9/047* (2013.01); *B32B 17/00* (2013.01); *F01D 5/282* (2013.01); *F01D 21/045* (2013.01); *F01D 25/005* (2013.01); *F02C 7/20* (2013.01); *B32B 2260/023* (2013.01); *B32B 2262/0269* (2013.01); *B32B 2262/101* (2013.01); *B32B 2262/106* (2013.01); *B32B 2305/08* (2013.01); *B32B 2307/544* (2013.01); *B32B 2307/546* (2013.01); *B32B 2307/558* (2013.01); *B32B 2603/00* (2013.01);
(Continued)

(58) Field of Classification Search
None
See application file for complete search history.

(56) References Cited

U.S. PATENT DOCUMENTS

| 3,359,083 A | 12/1967 | Leichter | |
|---|---|---|---|
| 3,900,645 A * | 8/1975 | Morgan | B26D 3/085 156/247 |

(Continued)

FOREIGN PATENT DOCUMENTS

| GB | 1583324 | 1/1981 |
|---|---|---|
| WO | 2007112147 | 10/2007 |
| WO | 2010122351 | 10/2010 |

OTHER PUBLICATIONS

EP Extended Search Report for European Application No. 15183634.3 dated Nov. 23, 2015.

*Primary Examiner* — David Sample
*Assistant Examiner* — Donald M Flores, Jr.
(74) *Attorney, Agent, or Firm* — Carlson, Gaskey & Olds, P.C.

(57) ABSTRACT

A composite component includes a plurality of layers. A fracture region includes at least one fracture inducing layer in an overlapping relationship with at least one of the plurality of layers.

13 Claims, 3 Drawing Sheets

(51) Int. Cl.
  *B32B 5/26* (2006.01)
  *B32B 3/18* (2006.01)
  *F01D 5/28* (2006.01)
  *B32B 5/14* (2006.01)
  *B32B 7/02* (2006.01)
  *B29C 37/00* (2006.01)
  *F01D 21/04* (2006.01)
  *B29C 70/54* (2006.01)
  *B32B 9/00* (2006.01)
  *B32B 9/04* (2006.01)
  *B32B 17/00* (2006.01)
  *F01D 25/00* (2006.01)
  *F02C 7/20* (2006.01)

(52) U.S. Cl.
  CPC ...... *F05D 2220/32* (2013.01); *F05D 2220/36* (2013.01); *F05D 2300/6034* (2013.01); *Y02T 50/672* (2013.01)

(56) References Cited

U.S. PATENT DOCUMENTS

| | | |
|---|---|---|
| 5,558,907 A | 9/1996 | Steffier |
| 5,948,196 A | 9/1999 | Huang |
| 6,753,057 B1 | 6/2004 | Gardner, Jr. |
| 7,914,256 B2 | 3/2011 | Xie et al. |
| 8,455,137 B2 | 6/2013 | Benson et al. |
| 8,524,356 B1 | 9/2013 | Dan-Jumbo et al. |
| 2007/0234655 A1* | 10/2007 | Jakus ............... B65D 90/36 52/202 |
| 2010/0258236 A1 | 10/2010 | Bogue et al. |
| 2011/0220006 A1 | 9/2011 | Kaye et al. |
| 2012/0093658 A1* | 4/2012 | Appleton ........... B32B 38/1866 416/241 R |
| 2013/0337230 A1* | 12/2013 | Wilenski .............. B32B 5/14 428/156 |
| 2014/0067285 A1 | 3/2014 | Khonsari et al. |

* cited by examiner

COMPOSITE MATERIAL WITH CONTROLLED FRACTURE REGIONS

CROSS-REFERENCE TO RELATED APPLICATIONS

This application claims priority to U.S. Provisional Application No. 62/046,298, which was filed on Sep. 5, 2014 and is incorporated herein by reference.

BACKGROUND

As technology improves and costs decrease, a greater number of industries are turning to composite materials to meet manufacturing needs. Composite materials allow for the creation of strong and lightweight components when compared to metal alloys. Composite materials can also be easily formed into complex shapes.

Inspection of a composite component can be time consuming because fractures can occur along any portion of the component which requires inspection of the entire component. Additionally, excess material can be used to withstand failure in certain regions of the composite component which can increase the weight of the component. Therefore, there is a need for a composite component that is lightweight and is resistant to fracturing.

SUMMARY

In one exemplary embodiment, a composite component includes a plurality of layers. A fracture region includes at least one fracture inducing layer in an overlapping relationship with at least one of the plurality of layers.

In a further embodiment of the above, at least one of the plurality of layers is configured to remain substantially intact when at least one fracture inducing layer fails.

In a further embodiment of any of the above, at least one fracture inducing layer is configured to fail prior to at least one layer.

In a further embodiment of any of the above, the plurality of layers are configured to withstand a first loading and at least one fracture inducing layer is configured to withstand a second loading. The first loading is greater than the second loading.

In a further embodiment of any of the above, the fracture inducing layer includes a discontinuity at the fracture region.

In a further embodiment of any of the above, the discontinuity includes a plurality of perforations in at least one fracture inducing layer.

In a further embodiment of any of the above, at least one fracture inducing layer includes a first portion having a first strength and a second portion having a second strength greater than the first strength. The first portion is located at least partially within the fracture region.

In a further embodiment of any of the above, an outermost layer of the composite material includes fiberglass and at least one interior layer of the composite includes at least one of fiberglass, graphite, Kevlar, or woven fabric material.

In a further embodiment of any of the above, the composite component includes a first portion and a second portion with the first portion configured to separate from the second portion along the fracture region.

In a further embodiment of any of the above, the composite component is an airfoil. The first portion of the composite component includes a base portion of the airfoil and the second portion of the composite component includes a tip portion of the airfoil.

In another exemplary embodiment, a method of designing a composite component includes forming a composite component with a plurality of layers to withstand a first loading and forming a fracture region in the composite component with at least one fracture inducing layer to withstand a second loading. The first loading is greater than the second loading.

In a further embodiment of any of the above, the method includes maintaining at least one of the plurality of layers substantially intact when the at least one fracture inducing layer fails.

In a further embodiment of any of the above, the fracture inducing layer includes a discontinuity located in the fracture region.

In a further embodiment of any of the above, the discontinuity includes a plurality of perforations in the at least one fracture inducing layer.

In a further embodiment of any of the above, at least one fracture inducing layer includes a first portion that has a first strength and a second portion that has a second strength greater than the first strength. The first portion is located at least partially within the fracture region.

In a further embodiment of any of the above, at least one of the plurality of layers includes fiberglass, graphite, Kevlar, or woven fabric material.

In a further embodiment of any of the above, the second loading is approximately 90-95% of the first loading.

In a further embodiment of any of the above, the method includes separating a first portion of the composite component from a second portion of the composite component along the fracture region when the composite component experiences the first loading.

In a further embodiment of any of the above, the first portion of the composite component includes a base portion of an airfoil and the second portion of the airfoil includes a tip portion of the airfoil.

In a further embodiment of any of the above, failure of the at least one fracture inducing layer includes a first portion of the at least one fracture inducing layer moving relative to a second portion of the at least one fracture inducing layer.

The various features and advantages of this disclosure will become apparent to those skilled in the art from the following detailed description. The drawings that accompany the detailed description can be briefly described as follows.

DETAILED DESCRIPTION

Figure 1:
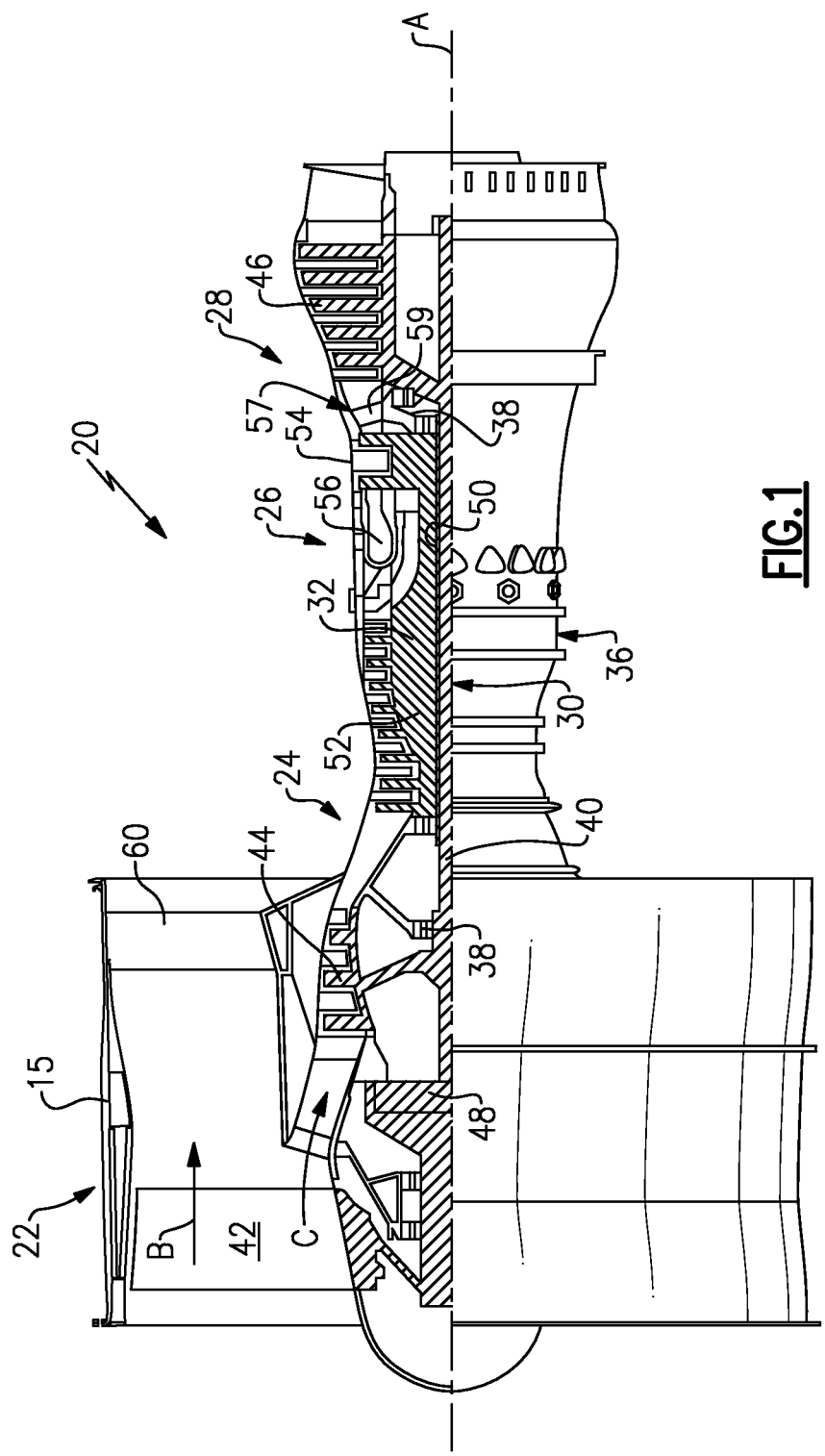
FIG. 1 is a schematic view of an example gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engines might include an augmentor section (not shown) among other systems or features. The fan section 22 drives air along a bypass flow path B in a bypass duct defined within a nacelle 15, while the compressor section 24 drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects a fan 42, a first (or low) pressure compressor 44 and a first (or low) pressure turbine 46. The inner shaft 40 is connected to the fan 42 through a speed change mechanism, which in exemplary gas turbine engine 20 is illustrated as a geared architecture 48 to drive the fan 42 at a lower speed than the low speed spool 30. The high speed spool 32 includes an outer shaft 50 that interconnects a second (or high) pressure compressor 52 and a second (or high) pressure turbine 54. A combustor 56 is arranged in exemplary gas turbine 20 between the high pressure compressor 52 and the high pressure turbine 54. A mid-turbine frame 57 of the engine static structure 36 is arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The mid-turbine frame 57 includes airfoils 59 which are in the core airflow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of combustor section 26 or even aft of turbine section 28, and fan section 22 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1. It should be understood, however, that the above parameters are only exemplary of one embodiment of a geared architecture engine and that the present invention is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet. The flight condition of 0.8 Mach and 35,000 ft (10,668 meters), with the engine at its best fuel consumption—also known as "bucket cruise Thrust Specific Fuel Consumption ('TSFC')"—is the industry standard parameter of 1 bm of fuel being burned divided by 1 bf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(Tram\ °\ R)/(518.7°\ R)]^{0.5}$. The "Low corrected fan tip speed" as disclosed herein according to one non-limiting embodiment is less than about 1150 ft/second (350.5 meters/second).

Figure 2:
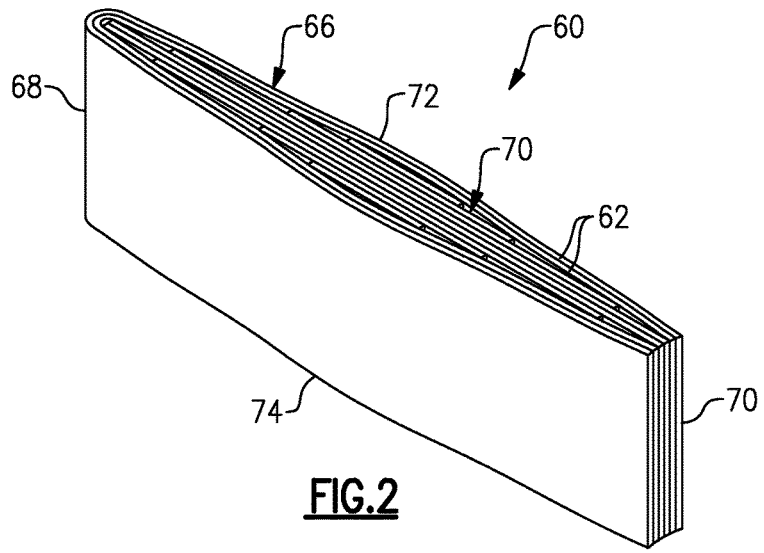
FIG. 2 illustrates a perspective view of an example composite component.

FIG. 2 illustrates an example composite component 60, such as a strut for supporting the gas turbine engine 20. The example composite component 60 is a multilayered composite component with two outer layers 62 surrounding multiple interior layers 64. In the illustrated example, the outer layers 62 are formed from a first type of material, such fiberglass, graphite, Kevlar, or another type of woven fabric material, and the interior layers 64 are formed from a second type of material, such as fiberglass, graphite, Kevlar, or another type of woven fabric material. Although the illustrated example is for a gas turbine engine 20, this disclosure applies to composite components for other applications such as athletics, construction, or health services.

Figure 3:
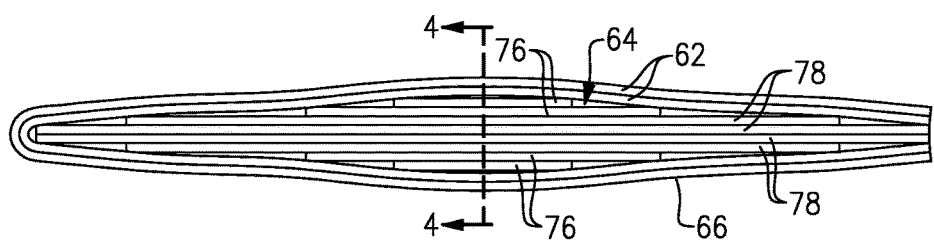
FIG. 3 illustrates a top view of the example composite component of FIG. 2.

The composite component 60 includes an axially leading edge 68, an axially trailing edge 70, a radially outer side 72 and a radially inner side 74. The interior layers 64 have varying shapes resulting in an exterior contour 66 of the composite component 60 with the outer layers 62 wrapping around the interior layers 64 with a beginning point and an ending point extending along the trailing edge 70. Although a particular exterior contour 66 is shown in FIGS. 2 and 3, another exterior contour for a different application would still fall within this disclosure. Although the composite component 60 is illustrated, the disclosure applies to all types of components made from a composite material and is not limited to the composite component 60 illustrated.

The interior layers 64 include at least one fracture inducing layer 76 and at least one structural layer 78 in an overlapping relationship with each other. The at least one fracture inducing layer 76 can be made of the same material as the at least one structural layer 78, or differing materials may be used to provide a localized stiffness discontinuity. The fracture inducing layers 76 can include at least one of a perforation 90 (FIG. 5), a discontinuity 83 (FIG. 7), or a first portion 76a having a weakened area (FIG. 6). The perforation 80, the discontinuity 83, and the first portion 76a are at least partially located within a fracture region 86. The fracture region 86 defines an area of the composite component 60 that is designed to fracture or fail at a lower force than the remaining portion of the composite component 60.

The interior layers 64 generally extend between the outer side 72 and the inner side 74 of the composite component 60 and the structural layers 78 are generally continuous between the inner and outer sides 74 and 72. As discussed above, not all of the interior layers 64 extend between the leading and trailing edge 68 and 70 for defining the exterior contour 66. However, depending on the desired exterior contour 66, some of the interior layers 64 may also be spaced inward from the radial radially outer and inner sides 72 and 74. The outer layers 62 may also be considered one of the structural layers 78.

Figure 4:
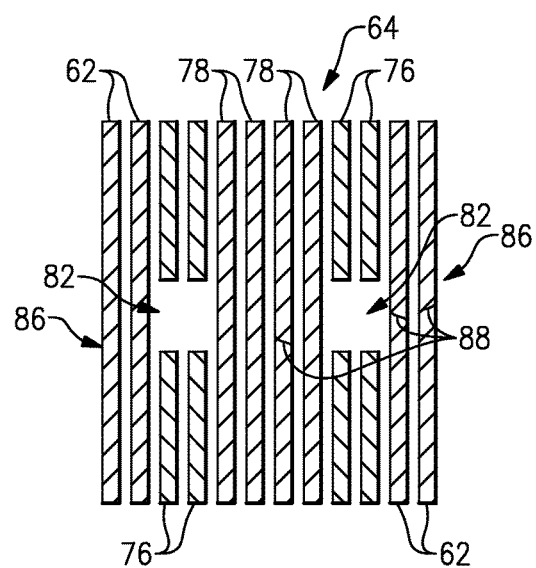
FIG. 4 illustrates a cross-sectional view taken along line 4-4 of FIG. 3.

As shown in FIG. 4, each of the fracture inducing layers 76 includes a fracture inducing portion 82 within the fracture region 86. By having a desired fracture region 86 in the composite component 60, a user of the composite component 60 will know that a fracture/failure 88 of the composite component 60 will occur along the fracture region 86. Therefore, inspection of the composite component 60 can focus on the fracture region 86 and thus reduce the time needed to inspect the composite component 60. The composite component 60 will also be driven towards a specific, known, failure mechanism by the fracture inducing layers 76.

In the illustrated example of FIG. 4, the fracture/failure 88 extends through the outer layers 62 adjacent the fracture inducing portion 82 and one of the structural layers 78 without traveling through the remainder of the composite component 60. Therefore, a user can observe the fracture/failure 88 before a failure would occur that could cause the composite component 60 to separate into multiple pieces and damage adjacent components or harm the user. Although the illustrated example shows the fracture/failure 88 located in two of the outer layers 62 and only one of the structural layers 78, the fracture/failure 88 could occur in additional interior or outer layers 64 and 62 within the fracture region 86. However, at least one of the interior or outer layers 64 or 62 will generally remain substantially intact.

Figure 5:
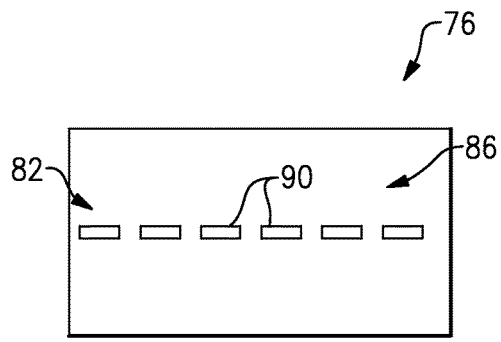
FIG. 5 illustrates an example fracture inducing layer.
Figure 6:
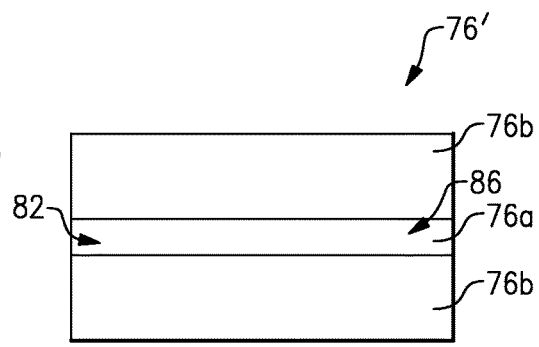
FIG. 6 illustrates another example fracture inducing layer.

FIG. 5 illustrates an example embodiment of the fracture inducing layer 76 including perforations 90 extending along the fracture region 86. The perforations 90 in the fracture inducing layer 76 introduce a weakness in the fracture region 86. Since the fracture inducing layer 76 is made of a graphite, Kevlar, fiberglass, or woven fabric material, the perforations 90 weaken the graphite or Kevlar by severing fibers in the material increasing the likelihood that the material will fail along the perforations 90 and spread into the adjacent fracture region 86.

FIG. 6 illustrates another example embodiment of the fracture inducing layer 76'. The fracture inducing layer 76' includes a first portion 76a located within the fracture region 86 and second portions 76b located on either side of the first portion 76a. The first portion 76a has a first strength and the second portion 76b has a second strength greater than the first strength so that failure in the fracture inducing layer 76' would occur in the first portion 76a in the fracture region 86 before the second portion 76b. Varying the strength in the first portion 76a and the second portion 76b may be accomplished by adjusting the weave of the fabric material in the first portion 76a and the second portion 76b locally to adjust the strength, or by incorporating a separate fiber material into the first portion 76a and the second portion 76b.

Figure 7:
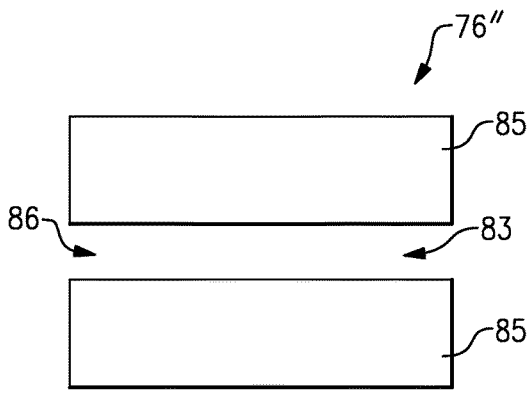
FIG. 7 illustrates a further example fracture inducing layer.

FIG. 7 illustrates another example embodiment of the fracture inducing layer 76". The fracture inducing layer 76" includes the discontinuity 83 extending the length of the fracture inducing layer 76". Although the discontinuity 83 in the illustrated example shows separate portions 85 of the fracture inducing layer 76" being spaced from each other, the separate portions 85 of the fracture inducing layer 76" could be in an abutting relationship and still have a discontinuity 83 in the fracture inducing layer 76". The fracture inducing layer 76" may also be slit so that a significant portion of the separate portions 85 are locally compromised, but will still allow reasonable control of the fracture inducing layer 76" layer during component fabrication.

Figure 8:
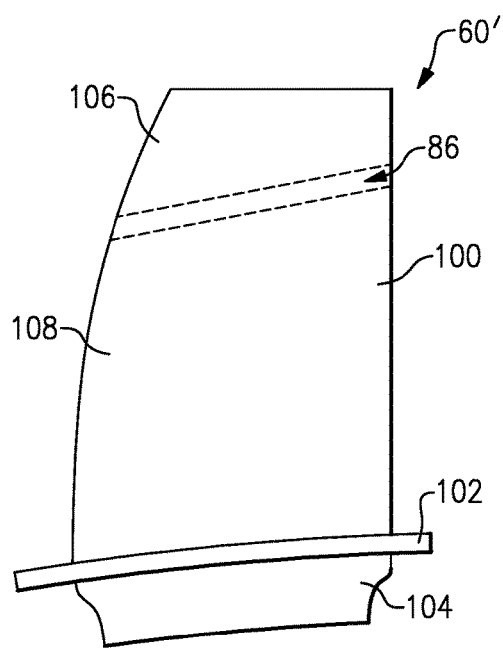
FIG. 8 illustrates another example composite component.

FIG. 8 illustrates another example composite component 60'. The composite component 60' functions similarly to the composite component 60 except where described below or shown in the Figures. In the illustrated example, the composite component 60' is a fan blade for the gas turbine engine 20 and includes an airfoil 100, a platform 102, and optionally a root portion 104. Unlike traditional composite components, the composite components 60 and 60' are designed to fail, if at all, along the fracture region 86.

The composite component 60' is designed such that if a failure or fracture would occur along the airfoil 100, a radially outer portion 106 would be more likely to separate from the remainder 108 of the airfoil 100 along the fracture region 86. This will prevent a greater portion of the airfoil 100 from separating and allow the remainder 108 of the airfoil 100 to continue to provide some thrust, reduce imbalance in the fan 42, and decrease the amount of debris that could enter the gas turbine engine 20. In the illustrated example, the remainder 108 includes approximately 60% of the airfoil 100. In another illustrated example, the remained 108 includes approximately 70-80% of the airfoil 100.

The composite components 60 and 60' are designed with multiple layers, such as interior layers 64 and exterior layers 62, to withstand a first loading, such as a tensile force, a compressive force, or a torque. The fracture region 86 is then selected that will allow the composite component 60 and 60' to fail or fracture in a manner that will reduce damage to surrounding components and allow for easier inspection by limiting the failure area to a specific region predetermined region The fracture region 86 is formed by incorporating the fracture inducing layer 76 with the fracture inducing portion 82 into the composite component 60 and 60'. The fracture inducing layer 76 allows the fracture region 86 to withstand a second loading that is less than the first loading for the remainder of the composite component 60 and 60'. However, it is also possible that the fracture region 86 could extend along the entire fracture inducing layer 76 such that the entire fracture inducing layer 76 can only withstand the second loading. In one example, the second loading is between 90% and 95% of the first loading and in another example, the second loading is between 95% and 99% of the first loading.

When a failure or fracture occurs in the composite component 60 and 60', relative movement will generally result between portions of the fracture inducing layer 76 that will cause a failure/fracture 88 in at least one of the surrounding layers of the composite component 60 and 60'. However, in the case of a catastrophic event, such as a bird strike, the radially outer portion 106 will be more likely to separate from the remainder 108 of the airfoil 100 at the fracture region 86 because of the load transferring through the fracture region 86.

The preceding description is exemplary rather than limiting in nature. Variations and modifications to the disclosed examples may become apparent to those skilled in the art that do not necessarily depart from the essence of this disclosure. The scope of legal protection given to this disclosure can only be determined by studying the following claims.

What is claimed is:

1. A composite component comprising:
    a plurality of layers;
    a fracture region including at least one fracture inducing layer in overlapping relationship between the plurality of layers, wherein the fracture inducing layer includes a discontinuity at the fracture region and the discontinuity includes a plurality of perforations forming an opening extending between opposing sides of the at least one fracture inducing layer and at least one of the plurality of layers is configured to remain substantially intact when the at least one fracture inducing layer fails; and
    wherein the composite component is an airfoil and includes a first portion defining a base portion of the airfoil and a second portion defining a tip portion of the airfoil with the first portion configured to separate from the second portion along the fracture region.

2. The composite component of claim 1, wherein the at least one fracture inducing layer is configured to fail prior to the at least one layer.

3. The composite component of claim 1, wherein the plurality of layers are configured to withstand a first loading and the at least one fracture inducing layer is configured to withstand a second loading, the first loading is greater than the second loading.

4. The composite component of claim 1, wherein the at least one fracture inducing layer includes a first portion having a first strength and a second portion having a second strength greater than the first strength, wherein the first portion is located at least partially within the fracture region.

5. The composite component of claim 1, wherein an outermost layer of the composite material includes fiberglass and at least one interior layer of the composite includes at least one of fiberglass, graphite, Kevlar, or woven fabric material.

6. A method of designing a composite component comprising:
    forming a composite component with a plurality of layers to withstand a first loading;
    forming a fracture region in the composite component with at least one fracture inducing layer to withstand a second loading, wherein the first loading is greater than the second loading and the fracture inducing layer includes a severed fiber; and
    wherein the composite component is an airfoil and includes a first portion defining a base portion of the airfoil and a second portion defining a tip portion of the airfoil with the first portion configured to separate from the second portion along the fracture region.

7. The method of claim 6, further comprising maintaining at least one of the plurality of layers substantially intact when the at least one fracture inducing layer fails.

8. The method of claim 6, wherein the fracture inducing layer includes a discontinuity located in the fracture region.

9. The method of claim 8, wherein the discontinuity includes a plurality of perforations in the at least one fracture inducing layer.

10. The method of claim 6, wherein the first portion includes a first strength, the second portion includes a second strength greater than the first strength, and the first portion is located at least partially within the fracture region.

11. The method of claim 6, wherein at least one of the plurality of layers includes fiberglass, graphite, Kevlar, or woven fabric material.

12. The method of claim 6, wherein the second loading is approximately 90-95% of the first loading.

13. The method of claim 6, wherein failure of the at least one fracture inducing layer includes the first portion of the at least one fracture inducing layer moving relative to the second portion of the at least one fracture inducing layer.

* * * * *